Feb. 12, 1946. H. F. LOEWER 2,394,704
MANUFACTURE OF WOODEN SOLES
Filed Oct. 6, 1943 2 Sheets-Sheet 1

Inventor
Henry F. Loewer
By his Attorney
Thomas Ryan

Feb. 12, 1946.  H. F. LOEWER  2,394,704
MANUFACTURE OF WOODEN SOLES
Filed Oct. 6, 1943  2 Sheets-Sheet 2

Inventor
Henry F. Loewer
By his Attorney
Thomas J. Ryan

Patented Feb. 12, 1946

2,394,704

UNITED STATES PATENT OFFICE 2,394,704

MANUFACTURE OF WOODEN SOLES

Henry F. Loewer, Rochester, N. Y., assignor to United Last Company, Portland, Maine, a corporation of Maine Application October 6, 1943, Serial No. 505,167

14 Claims. (Cl. 36—33)

This invention relates to improvements in wooden soles, to methods of making the same, and to improvements in shoes having wooden soles.

In the manufacture of wooden soles in accordance with methods generally practised heretofore a wooden block is reduced to the shape desired for the sole by cutting operations performed upon the block by means of suitable woodworking tools. Such methods of manufacture are expensive inasmuch as many of the woodworking operations are wasteful of the wood and require the use of special and costly machinery. Moreover, in soles shaped by such methods there are localities where the grain of the wood extends angularly with respect to the upper and lower faces of the soles and in such localities the soles are very liable to break or split. Such soles also frequently become warped to such an extent that they are rendered unsuitable for use.

Objects of the present invention are to reduce the cost of manufacture of wooden soles and to produce wooden soles which are stronger and more serviceable than those heretofore made.

With this object in view the invention provides for the production of a sole of laminated formation by assembling a plurality of flat layers or plies in face-to-face relation with material having active adhesive properties between adjacent layers, molding the assembled layers between forms or dies and allowing the adhesive material to become hardened and set while the layers are under the influence of the molding pressure whereby there is produced a substantially rigid sole having desired last conforming curvatures. As herein illustrated, three layers or plies of wood are employed in making the sole, two of these layers being relatively thin and being cut with the grain of the wood extending lengthwise of the layers so that the layers are quite pliable and capable of being readily curved or shaped as desired by molding pressure, and the third layer, which is to constitute the middle layer of the assembly, being relatively thick and being cut so that the grain extends endwise to its upper and lower surfaces, this layer being substantially rigid so that it is impracticable to curve or shape it by an ordinary molding operation. This layer is treated, however, to adapt it to be molded, the treatment, as herein illustrated, consisting in forming a plurality of transverse cuts or slashes extending from one side of the layer nearly but not quite to the opposite side thereof. Preferably, and as illustrated, the thick layer and one of the thin layers are first assembled with adhesive between them and secured together in a press having flat-surfaced pressure-applying members thereby producing a two-ply sole blank in which both of the layers are flat. The thick layer is then slashed to adapt it to be molded, after which the third layer is applied to the uncovered side of the slashed layer, with adhesive between the last-mentioned layers, and the assembly placed between forms or dies which are curved to correspond to the longitudinal curvatures of a last bottom. The molding pressure is then applied and maintained until the adhesive has become set or hardened.

Invention is also to be recognized as residing in the improvements in wooden soles and in shoes having wooden soles hereinafter described and claimed, the advantages of which will be apparent to those skilled in the art.

Referring to the drawings.

Figure 1:
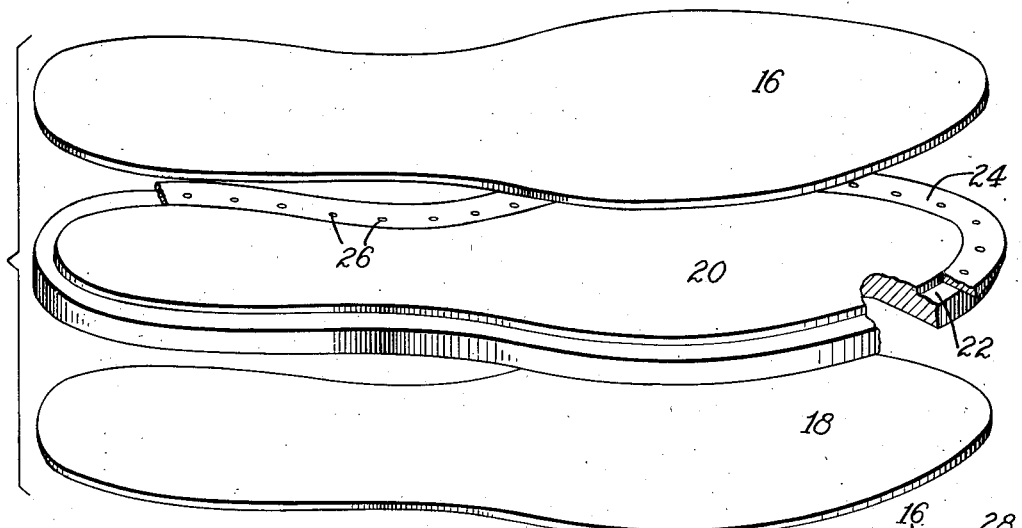
Fig. 1 is a perspective view of the three sole-shaped layers of wood employed in the manufacture of my improved sole, one of the layers having secured thereto a welt by means of which the sole is adapted to be attached to the upper of a shoe.

The improved sole illustrated in the drawings comprises three layers or plies of wood, viz., relatively thin upper and lower layers 16 and 18, respectively, and a relatively thick intermediate layer 20. The upper layer 16 and the lower or tread layer 18 are each died out to the desired edge contour from a flat sheet or ply of wood such as maple or birch veneer, the dies being preferably positioned so that the grain of the wood will extend lengthwise of the sole layers. The intermediate layer 20 is died out from a thicker layer or ply of wood which has been formed by cutting a log or block crosswise so that the grain extends endwise to the upper and lower surfaces of the died-out layer. The thin upper layer 16 and the thick intermediate layer 20 (which may be called the end grain layer) are secured together in face-to-face relation by means of adhesive while they are in a flat condition thereby producing a two-ply structure which is of substantial rigidity because of the stiffness of the end grain layer. The layer 20 is thereafter treated, as will hereinafter be explained, to make it readily bendable, and finally the lower layer 18 is assembled with the other layers and all three layers are then simultaneously bent or molded to shape them in conformity with the lengthwise curvature of the bottom of a last, the lower layer 18 being secured by means of an adhesive to the intermediate layer 20 while the layers are retained under the influence of the molding pressure. When the adhesive between the intermediate and outer layers has become set, a substantially rigid laminated sole structure is provided which will permanently retain its molded form.

Figure 3:
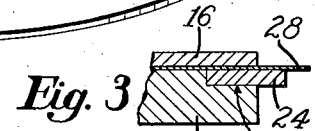
Fig. 3 is a fragmentary view, in vertical section and on an enlarged scale, of the sole layer assembly shown in Fig. 2.

Before the upper layer 16 and the intermediate layer 20 are secured together the intermediate layer may be marginally routed or rabbeted at one side to form a marginal recess 22, as shown in Figs. 1 and 3, for receiving a welt strip 24 of leather or the like to provide means whereby the sole layers may be attached to the upper of a shoe. The strip 24 may be secured to the layer 20 by tacks 26 or it may be attached by means of cement. The arrangement is such that the upper face of the welt strip is flush with the upper surface of the wood layer and the welt strip projects outwardly beyond the edge of the wood layer a sufficient distance to receive sole attaching stitches.

Figure 2:
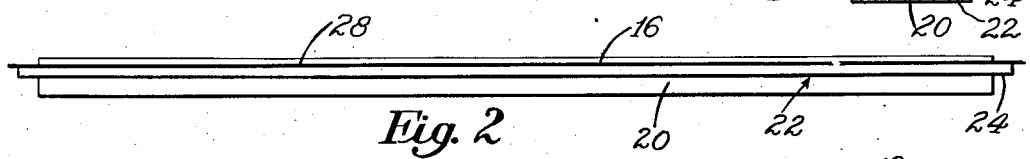
Fig. 2 is an edge view of two of the sole layers showing them as they appear after having been assembled with a thin sheet of softened Celluloid between them.
Figure 4:
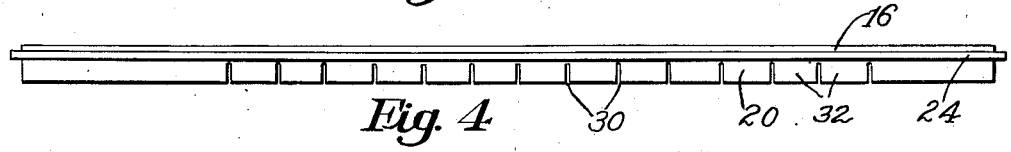
Fig. 4 is an edge view of the sole layer assembly illustrating further steps in the manufacture of the sole.
Figure 5:
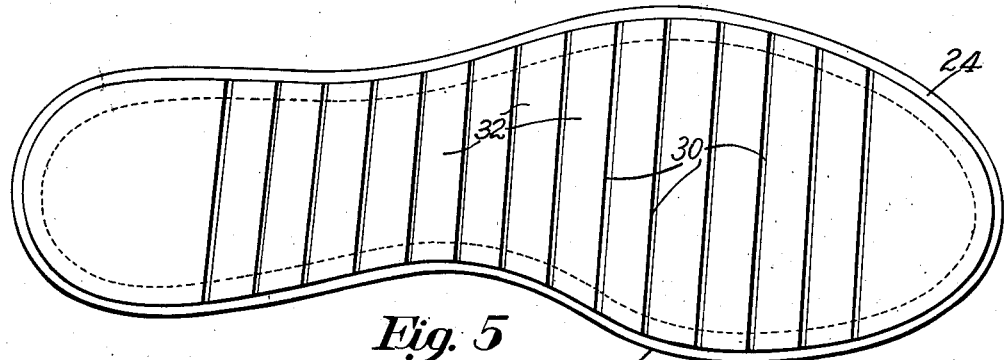
Fig. 5 is a bottom view of the sole layer assembly shown in Fig. 4.

The sole layers 16 and 20 are secured together with the welted side of the layer 20 facing the layer 16 by means of an adhesive such as pyroxylin cement or by means of a suitable plastic. For example, I may employ a plastic or cementitious film such as may be produced by subjecting a thin sheet of Celluloid or similar material to the action of acetone or other suitable solvent therefor. The securing of a satisfactory bond between the layers may be facilitated by roughening or pricking the sole layer surfaces which are to face one another before the adhesive medium is applied. If Celluloid or the like is used to constitute the bonding agent, a piece of sheet Celluloid slightly larger than the wooden layers is immersed in the solvent and then laid upon the welted side of the layer 20 so as completely to cover that side of the layer and to extend beyond the outer edge of the welt. In Figs. 2 and 3 the piece of softened Celluloid is indicated conventionally at 28. Thereafter the sole layer 16 is laid over the Celluloid piece 28 with the edges of the layers 16 and 20 in alinement, the assembled layers are placed in a press having flat-surfaced pressure-applying members and the press is operated to apply a substantial amount of pressure to the layers and to maintain the pressure until the softened Celluloid has become hardened or set and the wooden sole layers 16 and 20, each in a flat condition, have become securely bonded together by the hardened Celluloid. After the sole layers have been removed from the press any portions of the Celluloid which may extend outwardly beyond the alined edges of these layers will be removed by a trimming operation. At this stage in its manufacture the sole will appear as illustrated by Fig. 2.

The flat, two-ply sole structure produced by the above-described procedure is substantially rigid and, in order to prepare it for being molded, a plurality of cuts or slashes 30 are made in the relatively thick sole layer 20, the cuts being parallel to each other and extending entirely across the layer so that the layer is divided into a plurality of articulated slat-like members 32 capable of moving slightly toward and from one another to permit the layer to conform to the curvature of the molds. The cuts or slashes 30 may be made, for example, by means of a gang of circular saws or by a gang of knives, the latter expedient being feasible because of the fact that the grain of the wood in the layer 20 extends endwise to the surfaces of that layer. Preferably the cuts are made so that they terminate somewhat short of the plane of the lower side of the welt strip 24 to avoid danger of cutting into that strip. Inasmuch as the grain extends endwise to the surfaces of the layer 20, the relatively thin uncut portions above the cuts 30 may become fractured during the cutting operation or, if they do not, they are quite likely to become cracked or fractured, in line with the cuts 30, under the influence of the bending or molding stress, to enable the layer 20 to conform to the curvature of the molds.

Figure 6:
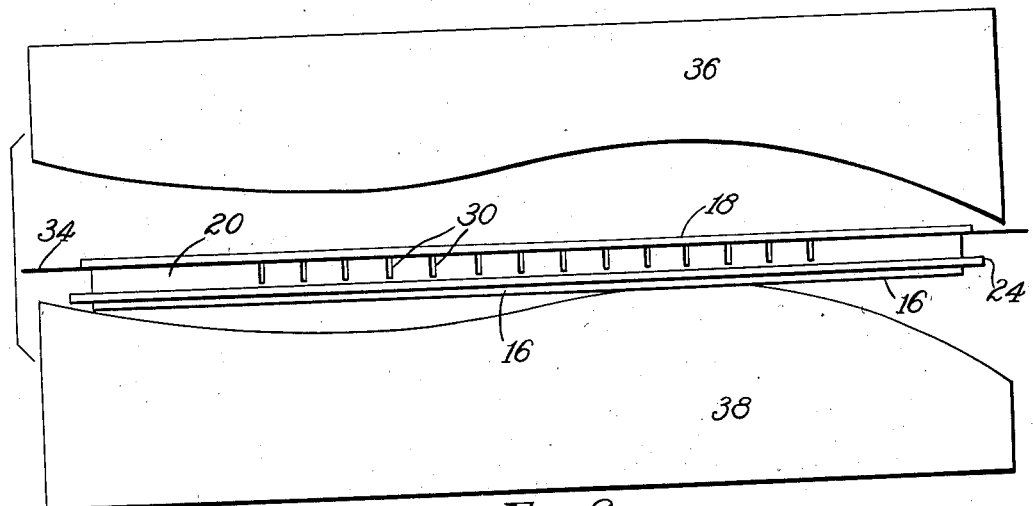
Fig. 6 is an edge view of the sole as it appears after the third layer has been assembled with the other layers, the sole being shown between molds by means of which it is to be molded into last-conforming shape.

The layer 20 having been slashed or cut as above described, the two-ply sole unit is inverted and the layer 18 is positioned above the layer 20, with a plastic or cementitious film (in the form, for example, of a piece of softened sheet Celluloid) interposed between the layers. At this stage of operations the sole assembly will appear as it is shown in Fig. 6, the Celluloid sheet being indicated at 34. The assembly is then introduced between separated upper and lower molds 36 and 38 (see Fig. 6) the lower of which may be fixed while the upper member is capable of being moved toward and from the fixed member by any suitable mechanism. The opposed surfaces of the upper and lower molds 36 and 38 are shaped to correspond to the lengthwise curvature of the bottom of a last and as the upper mold is moved into cooperative relation to the lower mold the three-ply sole layer assembly will be shaped to conform to the curvature of the molds. Suitable gage fingers (not shown) may be provided for positioning the sole assembly relatively to the mold members and, if necessary, suitable holddown mechanism may be employed to insure against displacing of the assembly by the movement of the upper mold.

Figure 7:
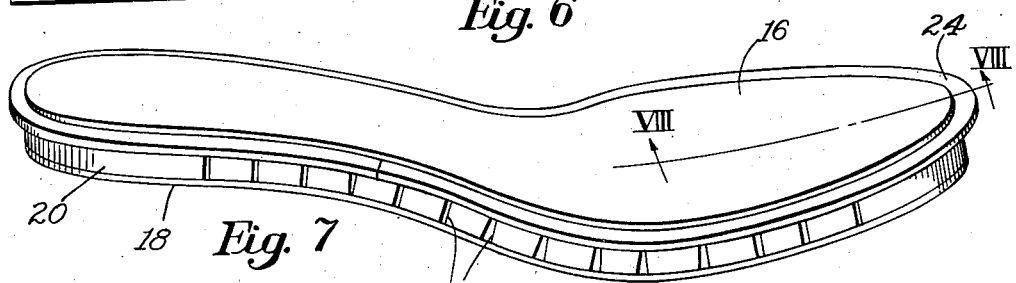
Fig. 7 is a perspective view of the molded sole.
Figure 8:
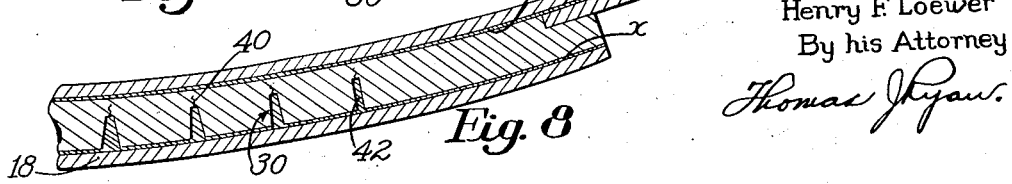
Fig. 8 is a fragmentary sectional view, on an enlarged scale, taken along the line VIII—VIII of Fig. 6.

During the molding operation the cuts 30 will open more or less in and near the ball portion of the sole, as indicated in Figs. 7 and 8. In these figures the sole is shown as it appears after having been removed from the mold and after any portions of the Celluloid which project beyond the margin of the sole have been trimmed off. In Fig. 8 the small cracks or fractures which may be formed between the upper face of the layer 20 and the upper ends of the cuts 30 are indicated at 40 and the thin layers of Celluloid between the sole layers are indicated conventionally at $x$. The molding pressure results in forcing portions of the softened Celluloid into the cuts 30 so as substantially to fill most of them as shown at 42 in Fig. 8. If any portions of the cuts 30 should be unfilled at or near the edge of the sole, a sufficient amount of softened Celluloid may be applied by hand so as completely to fill these portions and thereby insure that the edge face of the sole will be smooth and continuous so as to contribute to the attractiveness of the shoe to which the sole is attached.

The sole layers 16 and 20 having been secured together prior to the performance of the molding operation and while the layers were in a flat condition, and the layer 20 having been transversely cut as already described, there will be no creeping or slipping of these layers relatively to one another as the sole is being molded. Consequently, it is practicable to cut the layers 16 and 20 to the same edge contour and to employ a single die for the cutting of both layers. More or less slipping or creeping of the tread layer 18 upon the layer 20 will take place, however, during the molding operation and, accordingly, the tread layer 18 may be cut longer than the other layers to allow for such relative slipping movement. If the extent of this allowance should not prove to have been accurately predetermined, the edges of the layers 18 and 20 may be brought into alinement by performing an edge trimming operation upon the sole after it has been removed from the molds.

Figure 10:
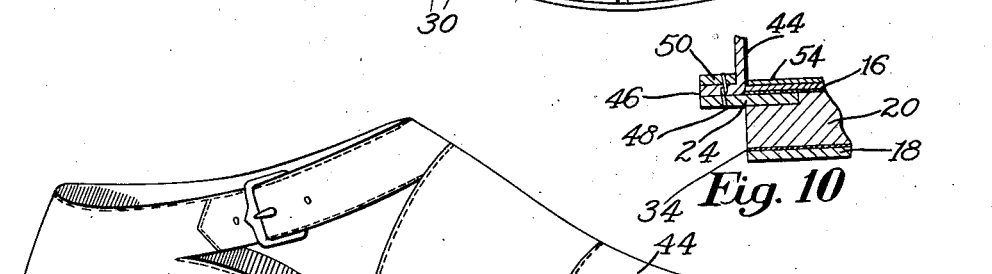
Fig. 10 is a fragmentary sectional view, on an enlarged scale, taken along the line X—X of Fig. 9.
Figure 9:
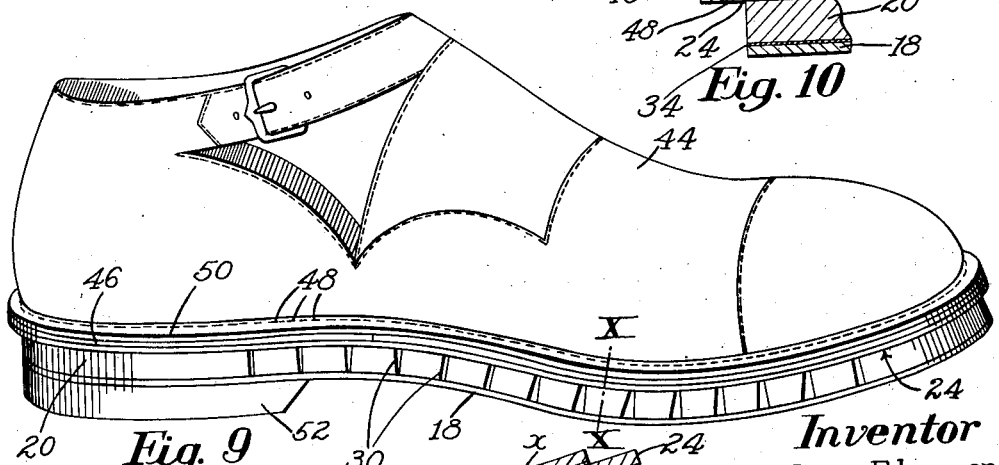
Fig. 9 is a perspective view of a shoe in which my improved sole is embodied.

The rigid sole unit produced by the above-described procedure has the longitudinal curvature desired and it is only necessary to attach an upper to the sole unit to provide a completed shoe. This may be accomplished, as illustrated in Figs. 9 and 10, by turning outwardly the lower marginal portions of an upper 44 to provide a sole-attaching flange 46 and securing the flange 46 to the welt strip 24 of the sole unit as by means of through-and-through stitches 48. A mock welt 50 may be applied, if desired, along the upper side of the flange 46 of the upper, the mock welt being secured to the upper flange by means of the stitches 48. As shown, a heel 52 may be attached to the sole to complete the shoe, and, if desired, a sock lining 54 (Fig. 10) may be cemented to the upper side of the sole.

In making the sole unit the layer 20 may be employed without having its margin rabbeted, the welt strip 24 may be omitted and the sole unit, after having been molded may be attached by means of cement, or otherwise, to the bottom of a lasted shoe made by conventional shoemaking methods.

Having described my invention, what I claim as new and desire to secure by Letters Patent of the United States is:

1. That improvement in the manufacture of soles which consists in providing a substantially rigid body layer and a flexible facing layer, treating said body layer to render it capable of being molded to a desired curvature, assembling said layers with an adhesive in a soft condition between them, molding the assembled layers to a desired curvature while said adhesive remains soft to permit creeping or slipping of said layers relatively to one another, and allowing the adhesive to become hardened or set while the molding pressure is being maintained thereby bonding said layers firmly together to provide a substantially rigid sole of laminated formation.

2. That improvement in the manufacture of soles which consists in providing a relatively stiff sole layer and a relatively flexible sole layer, making a plurality of cuts in said relatively stiff layer to make it readily moldable, assembling said layers in face-to-face relation with an adhesive in a softened condition between them, molding said layers to a desired curvature while said adhesive remains soft, and allowing the adhesive to become hardened or set while the molding pressure is maintained thereby securing said layers permanently in assembled relation to provide a substantially rigid laminated sole unit.

3. That improvement in the manufacture of soles which consists in forming in a substantially rigid sole layer a series of substantially parallel transverse cuts extending from one side of the layer nearly but not quite to the opposite side of the layer, positioning a relatively flexible layer in face-to-face relation to the cut side of the first sole layer with a soft adhesive between the layers, bending the assembled layers to a desired curvature while the adhesive remains soft, and permitting the adhesive to harden while the bending pressure is maintained thereby causing said layers to become bonded together to provide a substantially rigid sole of laminated formation.

4. That improvement in the manufacture of wooden soles which consists in making a series of substantially parallel transverse cuts in one side of a relatively thick sole-shaped layer of wood in which the grain extends endwise to the surfaces thereof, said cuts extending only part way through said layer, assembling a relatively thin sole-shaped layer of wood cut lengthwise of the grain in face-to-face relation to said thick layer with a soft adhesive between said layers, molding the assembled layers while the adhesive remains soft thereby causing the material between said cuts at the uncut side thereof to crack in line with said cuts to facilitate the molding of the layers, and permitting said adhesive to harden while the molding pressure is being maintained thereby providing a laminated sole of substantially rigid construction.

5. That improvement in the manufacture of plywood soles which consists in providing two relatively thin and flexible sole layers of wood and a relatively thick and stiff sole layer of wood, forming a series of substantially parallel transverse cuts in the exposed side of said thick layer to render said layer easily moldable, positioning one of said thin layers upon the cut side of said thick layer and the other thin layer on the other side of said thick layer with adhesive between said layers, and molding the three-layer assembly to a curvature corresponding to the longitudinal curvature of the bottom of a last.

6. That improvement in the manufacture of plywood soles which consists in providing two relatively thin and flexible sole layers of wood and a relatively thick and stiff sole layer of wood, securing one of said thin layers to said thick layer while maintaining said layers in a flat condition, forming a series of cuts in said stiff layer to render said layer easily moldable, positioning the other of said flexible layers upon the exposed side of said stiff layer with adhesive between said layers, and molding the three-layer assembly to a curvature corresponding to that of the bottom of a last.

7. That improvement in the manufacture of plywood soles which consists in providing two relatively thin and flexible sole layers of wood and a relatively thick and stiff sole layer of wood, securing one of said thin layers to said thick layer while maintaining said layers in a flat condition, forming a series of cuts in said stiff layer to render said layer easily moldable, positioning the other of said flexible layers upon the exposed side of said stiff layer with soft adhesive between said layers, molding the three-layer assembly to a desired curvature while said adhesive remains soft, and permitting said adhesive to harden while the molding pressure is being maintained, thereby providing a three-ply sole of substantially rigid construction.

8. That improvement in methods of making soles which consists in providing a flat and relatively thick and stiff layer of wood having a sole-shaped edge contour and two flat and relatively thin and flexible layers of wood each having an edge contour corresponding to that of said thick layer, securing one of said thin layers to one side of said thick layer by means of adhesive, forming a series of transverse slits in said thick layer to facilitate subsequent shaping thereof, applying the other of said thin layers to the opposite side of said thick layer with adhesive between said layers, shaping all three layers to impart thereto a lengthwise curvature corresponding to the lengthwise curvature of the bottom of a last by pressing the assembly of layers between suitably shaped molding dies, and maintaining said layers under molding pressure until said adhesive becomes effective to bond said thin layer to said thick layer thereby to provide a unitary and substantially rigid sole structure.

9. That improvement in methods of making soles which consists in providing two flat sole-shaped layers of relatively flexible material and a third flat sole-shaped layer of relatively stiff material, said third layer having a series of transverse slits extending from one side nearly but not quite to the opposite side thereof, said slits dividing said layer into a plurality of articulated slat-like members disposed crosswise thereof, arranging said layers with said third layer positioned between the other layers, molding said layers into conformity with the lengthwise curvature of a last bottom, and securing the molded layers together thereby providing a substantially rigid sole of laminated formation the upper and lower surfaces of which are continuous throughout the length and breadth of the sole.

10. A sole comprising a body layer conforming to the lengthwise curvature of a last bottom and consisting of a plurality of strip-like wooden members disposed transversely of the sole, a wooden tread layer conforming to the curvature of said body layer, and hardened plastic securing said tread layer to said members and extending between them, thereby providing a unitary and substantially rigid structure having a continuous tread surface.

11. A sole comprising relatively flexible upper and lower wooden layers curved to correspond to the curvature of a last bottom, a plurality of relatively stiff strip-like wooden members disposed transversely of the sole between said layers, and means securing said layers and said members together into a unitary structure.

12. A tread sole for a shoe comprising a relatively thick body layer of wood conforming to the lengthwise curvature of a last bottom and having a series of transverse cuts in its lower side, a relatively thin tread layer of wood conforming to the curvature of said body layer, and a thin sheet of hardened plastic between said layers adhesively securing said layers together, said sheet having portions integral therewith extending into and substantially filling the cuts in said body layer.

13. A tread sole for a shoe comprising relatively thin upper and lower layers of wood shaped to conform to the lengthwise curvature of the bottom of a last, a series of relatively thick slat-like pieces of wood extending crosswise of the sole between said layers, and hardened plastic material between said layers and said pieces adhesively uniting all of said parts to provide a substantially rigid structure.

14. A shoe bottom unit comprising three layers of wood secured together by means of adhesive, the middle layer having a marginal recess in its upper side for the reception of a sole attaching strip.

HENRY F. LOEWER.